United States Patent
Sgouromitis et al.

(10) Patent No.: US 12,203,415 B2
(45) Date of Patent: Jan. 21, 2025

(54) ENGINE EXHAUST REVERSE FLOW PREVENTION

(71) Applicant: PRATT & WHITNEY CANADA CORP., Longueuil (CA)

(72) Inventors: John Sgouromitis, Dorval (CA); Kashif Mohammed, Brossard (CA); Sylvain Lamarre, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/337,678

(22) Filed: Jun. 20, 2023

(65) Prior Publication Data

US 2024/0426246 A1 Dec. 26, 2024

(51) Int. Cl.
*F02C 7/18* (2006.01)
*F01D 21/14* (2006.01)
*F02K 3/115* (2006.01)

(52) U.S. Cl.
CPC ............... *F02C 7/18* (2013.01); *F01D 21/14* (2013.01); *F02C 7/185* (2013.01); *F02K 3/115* (2013.01); *F05D 2260/213* (2013.01); *F05D 2260/38* (2013.01)

(58) Field of Classification Search
CPC ........................... F05D 2260/513; F02K 3/115
See application file for complete search history.

(56) References Cited

U.S. PATENT DOCUMENTS

| | | | |
|---|---|---|---|
| 4,203,566 A | 5/1980 | Lord | |
| 7,040,576 B2 | 5/2006 | Noiseux et al. | |
| 8,434,692 B2 | 5/2013 | Scott | |
| 8,485,222 B2 | 7/2013 | Restivo | |
| 8,833,053 B2 | 9/2014 | Chir | |
| 9,267,390 B2 | 2/2016 | Lo | |
| 9,903,274 B2 | 2/2018 | Diaz | |
| 10,563,936 B2 | 2/2020 | Tajiri | |
| 10,590,799 B2 | 3/2020 | Zebian | |
| 10,739,086 B2 | 8/2020 | Aouizerate | |
| 11,060,462 B2 | 7/2021 | Fert et al. | |
| 2007/0245739 A1* | 10/2007 | Stretton | F02C 7/185 60/728 |
| 2009/0175718 A1 | 7/2009 | Diaz | |
| 2011/0030337 A1 | 2/2011 | Mons | |
| 2012/0168115 A1 | 7/2012 | Raimarckers | |
| 2014/0145008 A1 | 5/2014 | Webster | |

\* cited by examiner

*Primary Examiner* — Todd E Manahan
*Assistant Examiner* — Alyson Joan Harrington
(74) *Attorney, Agent, or Firm* — Norton Rose Fulbright Canada LLP

(57) ABSTRACT

An aircraft engine comprises an exhaust duct receiving an engine gas flow at a first pressure during an operating condition and at a second, lower pressure at shutdown. A heat exchanger duct connected to the exhaust duct has a heat exchanger disposed therein. A cover in the heat exchanger duct includes a closure movable between open and closed positions to fluidly connect or disconnect the heat exchanger duct to the exhaust duct. A biasing member disposed in the exhaust duct, exposed to the gas flow, and operatively connected to the closure biases the closure toward the closed position with a biasing force. First and second forces opposing the biasing force are generated on the biasing member by the gas flow at the first and second pressures, the first being greater than the second. The biasing force is greater than the second force and less than the first force.

20 Claims, 8 Drawing Sheets

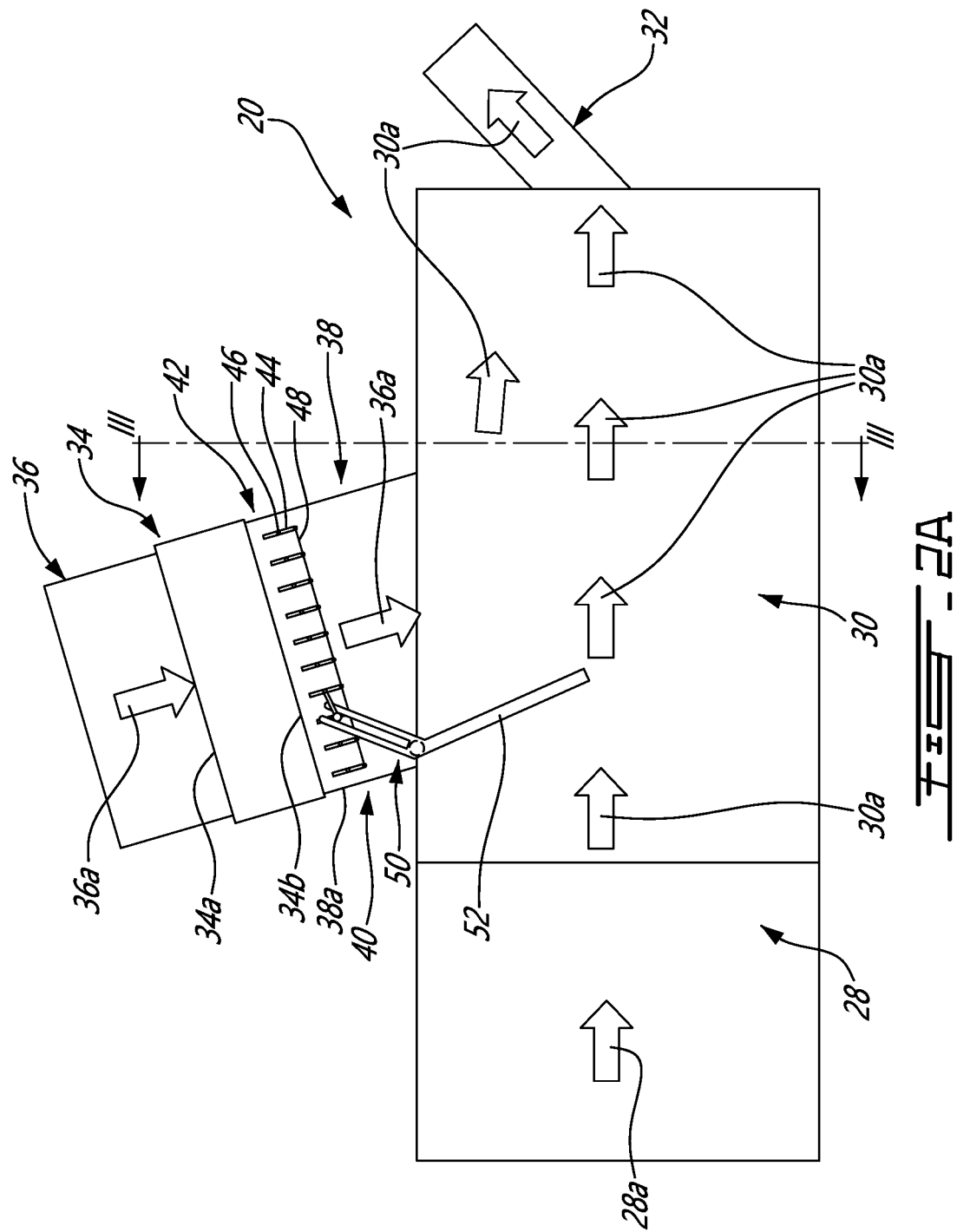

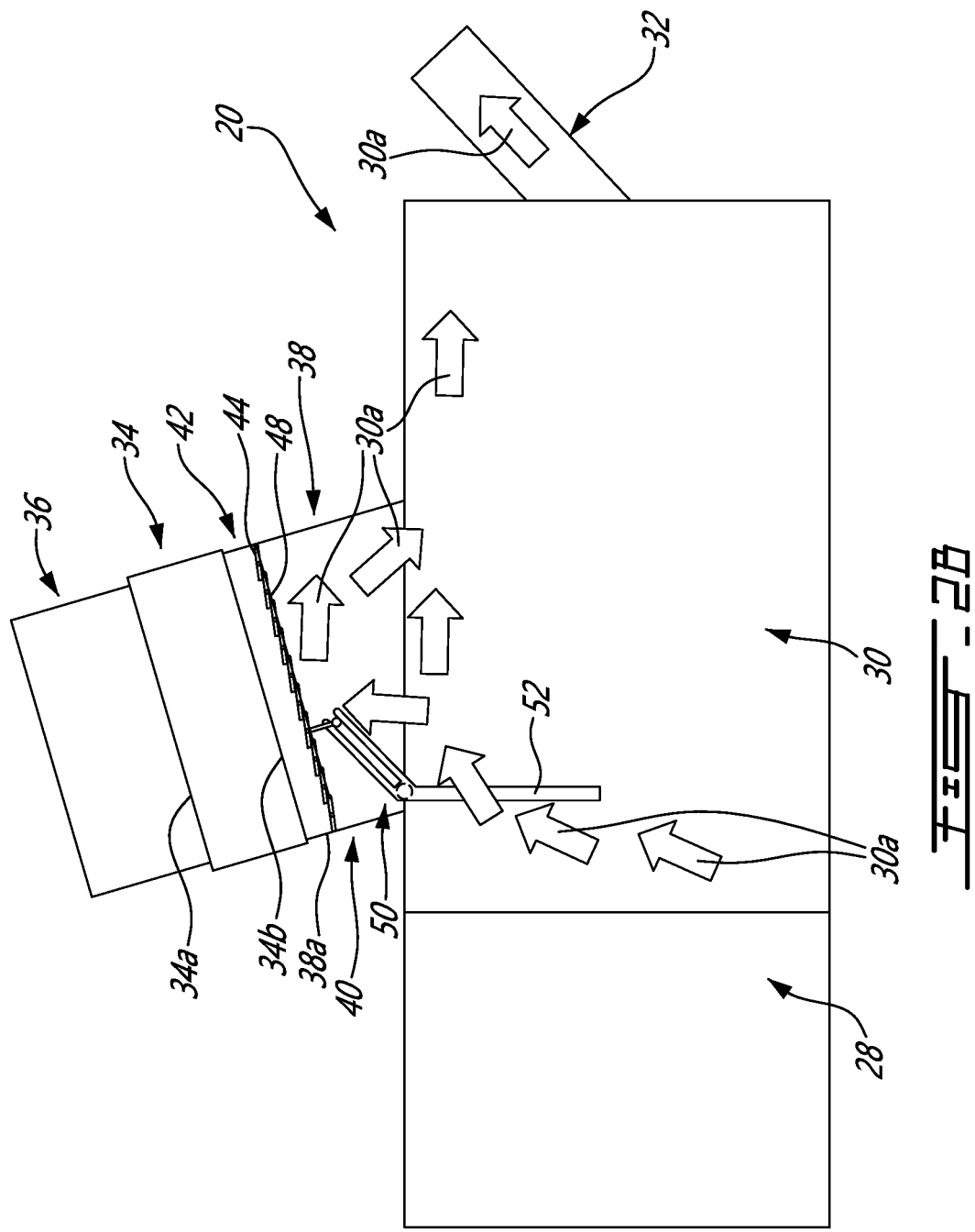

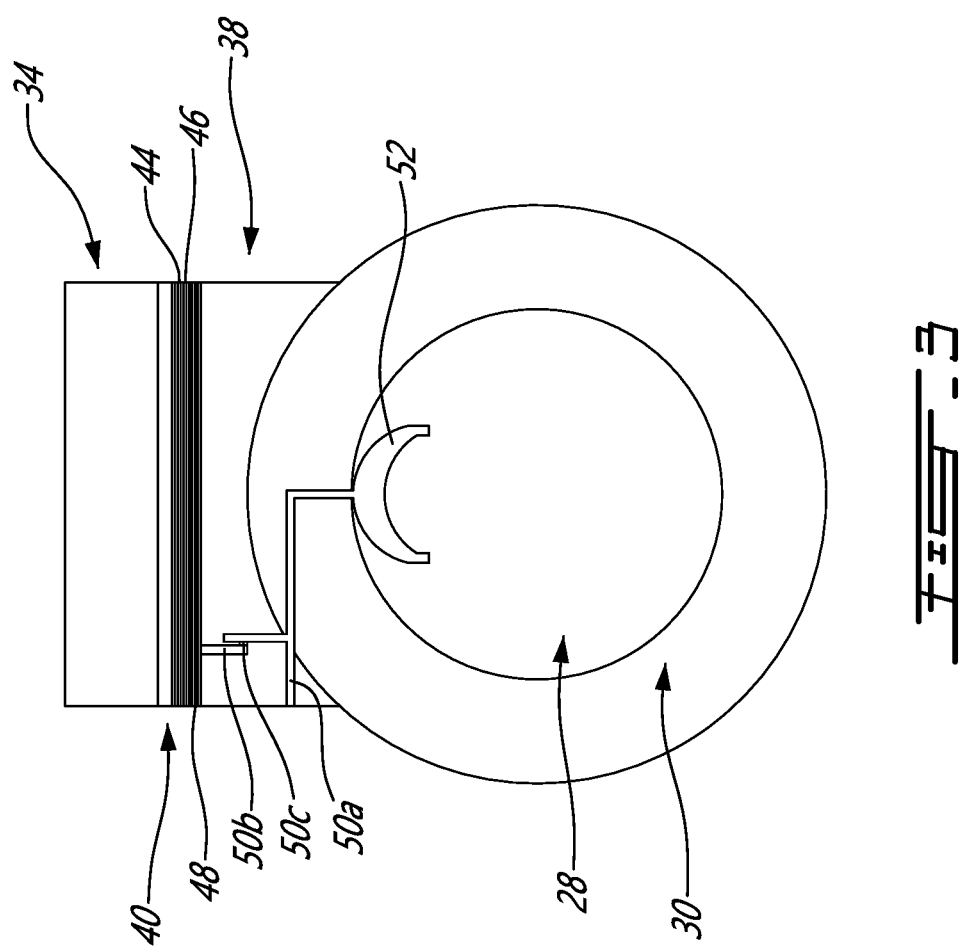

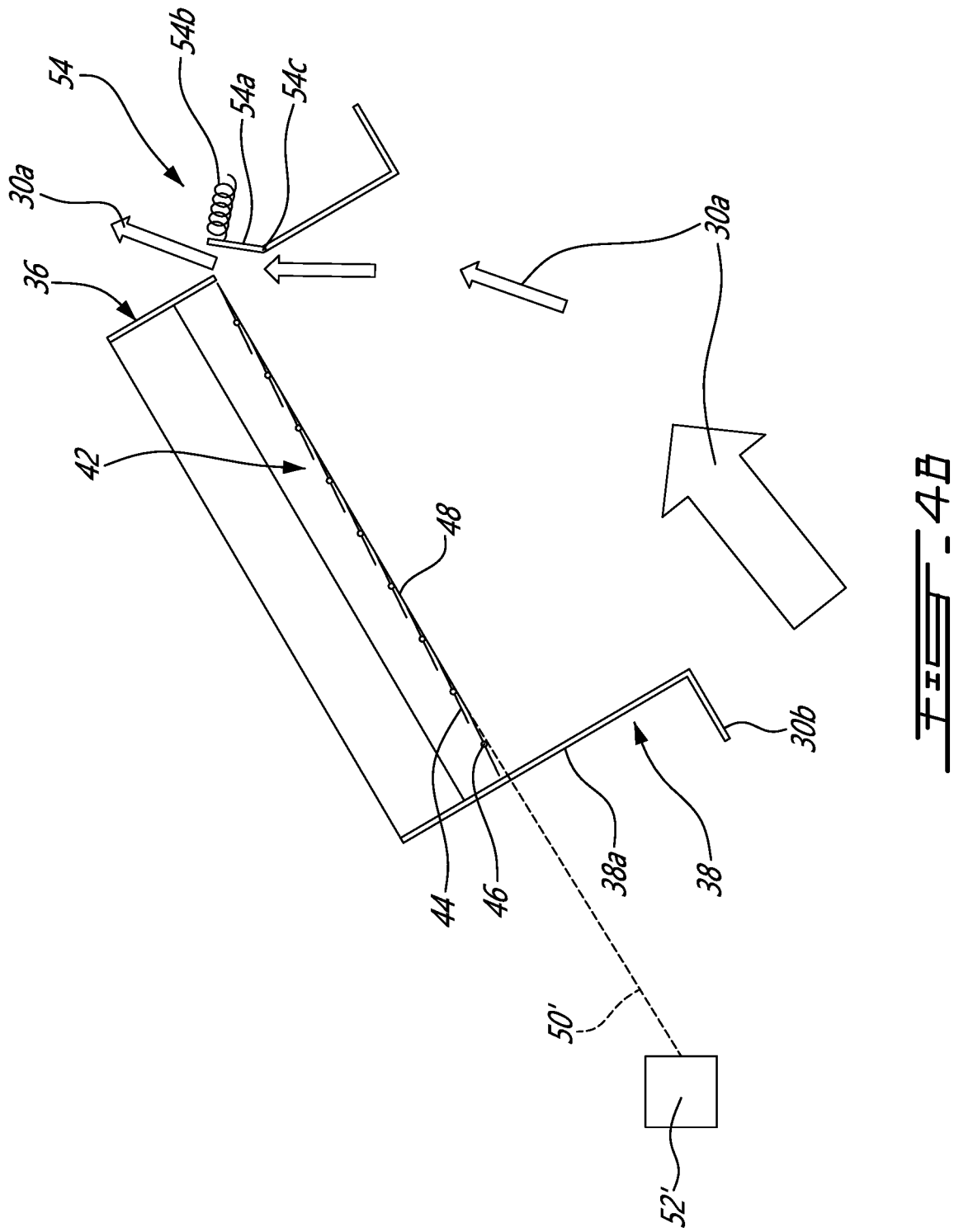

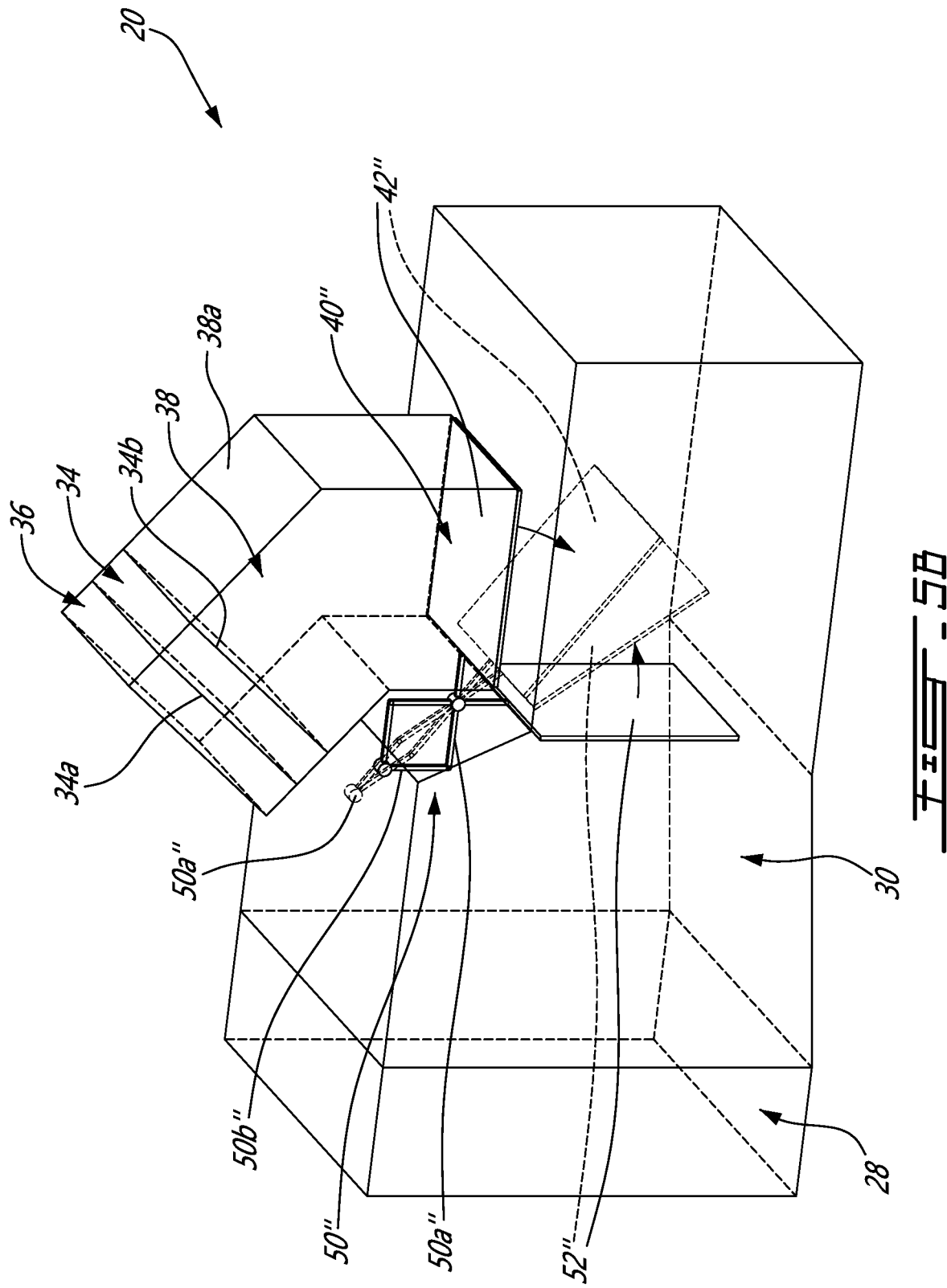

ENGINE EXHAUST REVERSE FLOW PREVENTION

TECHNICAL FIELD

The disclosure relates generally to aircraft engines, and more particularly, to exhaust flow management in aircraft engines.

BACKGROUND

In some aircraft engines, a duct for an air-cooled heat exchanger has its outlet coupled to the engine's exhaust duct. As such, the core gas path flowing through the exhaust duct can draw ambient air through the heat exchanger duct. When the engine shuts down and the airflow through the main engine gas path stops, remaining hot exhaust gas in the exhaust duct may vent outwards through the heat exchanger duct. If the heat exchanger includes temperature-sensitive materials such as aluminum, it may be susceptible to temperature-related damage due to the hot exhaust gas flowing therethrough. Improvements are therefore desired.

SUMMARY

In one aspect, there is provided an aircraft engine, comprising: an exhaust duct receiving a gas flow from the aircraft engine, the gas flow being at a first pressure during an operating condition of the aircraft engine and at a second pressure during a shutdown condition of the aircraft engine, the second pressure being lower than the first pressure; a heat exchanger duct having an air inlet for receiving a flow of cooling air and an air outlet fluidly connected to the exhaust duct; an air-cooled heat exchanger disposed in the heat exchanger duct between the air inlet and the air outlet; a cover disposed in the heat exchanger duct downstream of the air-cooled heat exchanger, the cover including a closure movable between an open position to fluidly connect the heat exchanger duct to the exhaust duct, and a closed position to fluidly disconnect the heat exchanger duct from the exhaust duct; and a biasing member disposed in the exhaust duct, the biasing member exposed to the gas flow and operatively connected to the closure, the biasing member biasing the closure toward the closed position with a biasing force, a first force generated on the biasing member by the gas flow at the first pressure being greater than a second force generated on the biasing member by the gas flow at the second pressure, the first and second forces opposing the biasing force, the biasing force being greater than the second force and less than the first force.

In another aspect, there is provided a cover system for selectively allowing a flow of cooling air through a heat exchanger duct upstream of an exhaust duct in an aircraft engine, the heat exchanger duct including an air-cooled heat exchanger disposed therein, comprising: a source of pressurized fluid fluidly connected to the exhaust gas duct, the pressurized fluid flowing into the exhaust duct at a first pressure during an operating condition of the aircraft engine and at a second pressure during a shutdown condition of the aircraft engine, the second pressure being lower than the first pressure; a closure movable between an open position in which the closure fluidly connects the heat exchanger duct to the exhaust duct, and a closed position in which the closure fluidly disconnects the heat exchanger duct to the exhaust duct; and a biasing member disposed in the exhaust duct and operatively connected to the closure, the biasing member biasing the closure towards the closed position with a biasing force; wherein, during the operating condition of the aircraft engine, the first pressure of the pressurized fluid creates a first force acting against the biasing force of the biasing member, the first force being greater than the biasing force to urge the closure into the open position; and during the shutdown condition of the aircraft engine, the second pressure of the pressurized fluid creates a second force acting against the biasing force, the biasing force being greater than the second force to bias the closure into the closed position.

In a further aspect, there is provided a method of operating an aircraft engine, comprising: operating the aircraft engine in a powered mode that includes passing a gas through a heat exchanger towards an exhaust duct of the aircraft engine; and transitioning the aircraft engine from the powered mode into shut down, the transitioning including preventing exhaust gas from flowing from the exhaust duct towards the heat exchanger, said preventing including actuating a biasing member disposed in the exhaust duct to bias a closure disposed fluidly between the heat exchanger and the exhaust duct closed.

BRIEF DESCRIPTION OF THE DRAWINGS

Reference is now made to the accompanying figures in which:

FIG. 2A is a schematic cross sectional view of an exhaust section of the engine of FIG. 1 in a first engine operational mode;

FIG. 2B is a schematic cross sectional view of an exhaust section of the engine of FIG. 1 in a second engine operational mode;

FIG. 3 is a schematic cross sectional view of the exhaust section of FIG. 2A in the first engine operational mode taken along line III-III;

FIG. 4B is a schematic cross sectional view of the heat exchanger duct of FIG. 4A in the second engine operational mode; and FIGS. 5A and 5B are, respectively, schematic cross sectional and perspective views of another embodiment of an exhaust section of the engine of FIG. 1.

DETAILED DESCRIPTION

Figure 1:
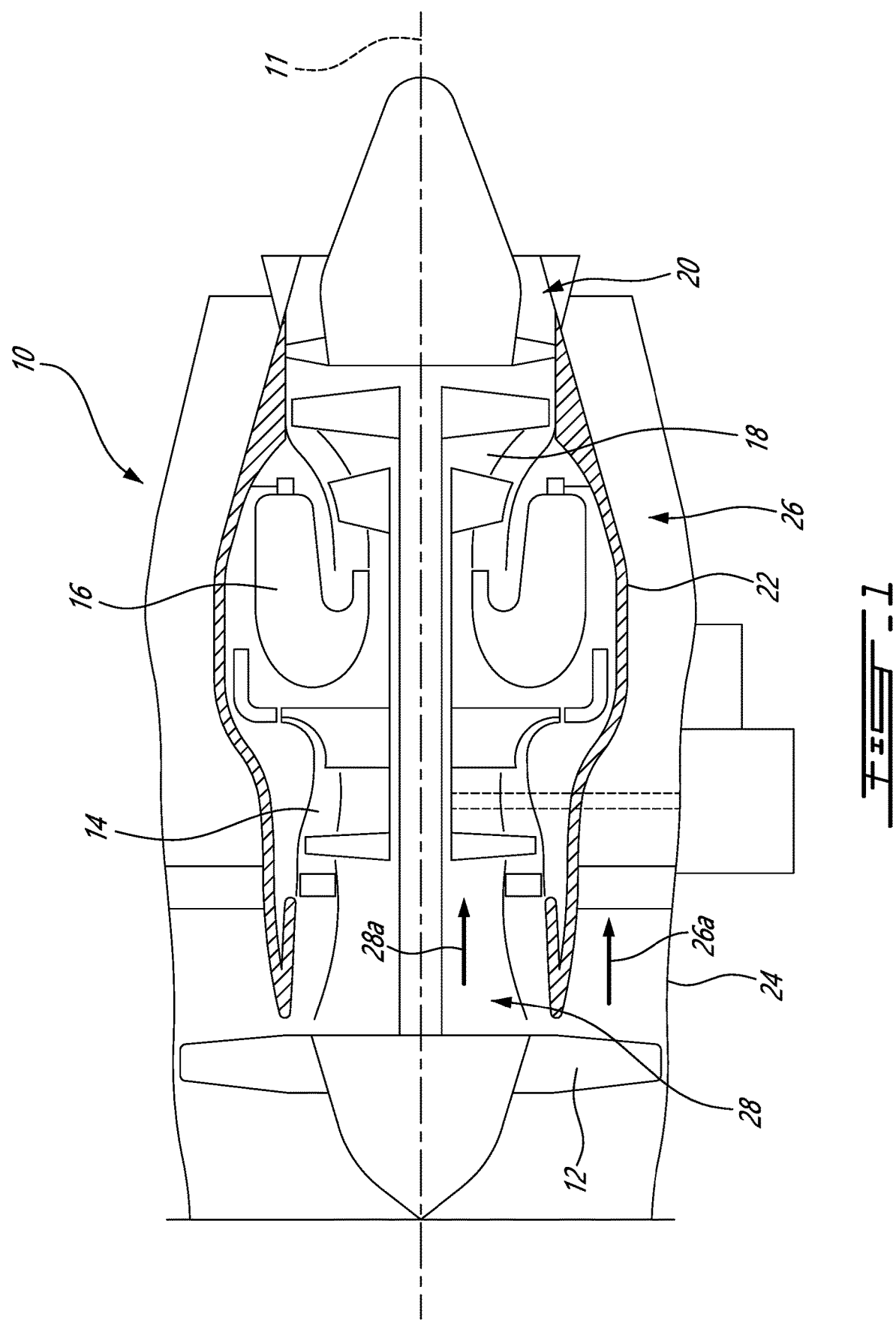
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 further includes an exhaust section 20 where hot combustion gases are expelled. While FIG. 1 depicts engine 10 as a turbofan-type gas turbine engine, the present disclosure may relate to other types of aircraft engines, such as turboprop engines, turboshaft engines, as well as hybrid-electric engines.

The gas turbine engine 10 includes a first, inner casing 22 which encloses the turbo machinery of the engine, and a second, outer casing 24 extending outwardly of the first casing 22 such as to define an annular bypass passage 26 therebetween, also referred to as a bypass duct or an annular outer passage. The air propelled by the fan 12 is split into a first portion which flows around the first casing 22 within the bypass passage 26, and a second portion which flows through a main gas path 28, also referred to as a core passage, which is defined within the first casing 22 and allows the gas flow to circulate through the multistage compressor 14, combustor 16 and turbine section 18 as described above. A core gas flow 28a is said to flow through the main gas path 28 (also referred to as the core gas path), while a bypass gas flow 26a is said to flow through the bypass passage 26.

Referring additionally to FIGS. 2A-2B, at the exhaust section 20 at the aft end of the engine 10, the core gas flow 28a and the bypass gas flow 26a (see FIG. 1) are exhausted from the engine 10 through an exhaust duct 30 and an external exhaust 32. In the depicted embodiment, engine 10 further includes an air-cooled heat exchanger 34 disposed adjacent the exhaust duct 30 and in fluid communication therewith. In an embodiment, the air-cooled heat exchanger 34 is an air-cooled oil cooler, in which warm engine oil is operable to transfer heat to the cool air flowing therethrough. Other types of air-cooled heat exchangers may be contemplated. In particular, the air-cooled heat exchanger 34 receives cooling airflow 36a via an air inlet duct 36, and exhausts the cooling airflow 36a into the exhaust duct 30 via an air outlet duct 38. The outlet duct 38 includes one or more walls 38a. In the shown case, the outlet duct 38 has a rectangular cross-section, although other arrangements may be contemplated. For instance, the outlet duct 38 may have a cylindrical wall 38a. The air-cooled heat exchanger 34 includes an inlet 34a receiving the cooling airflow 36a from the inlet duct 36 and an outlet 34b for expelling the cooling airflow 36a through the outlet duct 38 towards the exhaust duct 30. The inlet duct 36 and outlet duct 38 may collectively be referred to as a heat exchanger duct. The cross-sectional shape of the heat exchanger duct may vary, for instance the cross-sectional shape may be circular, square, rectangular or another shape.

Still referring to FIGS. 2A-2B, according to an embodiment of the present disclosure, the heat exchanger duct includes a cover 40, also referred to as a cover system. The heat exchanger duct, as well as the components found therewithin, may therefore be referred to as a heat exchanger duct assembly. The cover 40 is illustratively disposed in the outlet duct 38 portion of the heat exchanger duct, downstream of the air-cooled heat exchanger 34 and upstream of the exhaust duct 30. Other locations for the cover 40 maybe contemplated, for instance at the downstream end of the outlet duct 38, i.e., where the outlet duct 38 meets the exhaust duct 30. The depicted cover 40, also referred to as a cover mechanism, includes a closure 42 comprising a plurality of plates 44, also referred to as blinds or louvers, that are pivotally mounted to a duct wall 38a, illustratively via pins 46. In the shown case, the plates 44 are operatively coupled to one another via a rod 48 attached to each plate 44 at a distal end thereof, thereby intimately linking their pivoting motions (i.e., pivoting the plates 44 in unison). In other cases, each plate 44 may be independently pivotable. Other locations for the rod 48 attachment, or means for linking the plates 44 to one another, may be contemplated. Various numbers, shapes and sizes for the plates 44 may be contemplated. In some cases, a higher number of shorter plates 44 may be used, whereas in other cases a lower number of longer plates 44 may be used. The plates 44 may be sized, shaped and arranged so that in their closed configuration, they substantially occupy a cross sectional area of the outlet duct 38.

A linkage mechanism 50 operatively couples the closure 42 to a biasing member 52 (illustratively a plate) disposed in the exhaust duct 30 and exposed to the exhaust flow 30a. As will be discussed in further detail below, a force generated by the pressure of the exhaust flow 30a acts against the biasing member 52, said pressure being a function of an operating state of the engine 10. In particular, the exhaust flow 30a may flow with a first pressure at the operational condition of the engine 10 and generate a first force against the biasing member 52, and the exhaust flow 30a may flow with a second pressure (less than the first pressure) at the shutdown condition of the engine 10 and generate a second force (less than the first force) against the biasing member 52. These applications of forces against the biasing member 52 may bias the closure 42 between an open position (FIG. 2A) to fluidly connect the heat exchanger duct to the exhaust duct 30, and a closed position (FIG. 2B) to fluidly disconnect the heat exchanger from the exhaust duct 30. Various linkage mechanisms 50 and biasing members 52 may be contemplated, as will be discussed in further detail below. The biasing member 52 may generate a biasing force on the closure 42 to bias the closure 42 towards its closed position, for instance due to the force of gravity acting on the biasing member 52 or by way of an optional spring and/or weight added to the biasing member 52. The force generated by the pressure of the exhaust flow 30a thus acts against the biasing force of the biasing member in biasing the closure 42 towards its open position.

FIG. 2A illustratively depicts the engine 10 in an operational or running state or condition. Stated differently, the core gas flow 28a flows through the main gas path 28, i.e., through the compressor section 14, combustor 16 and turbine section 18 towards the exhaust section 20 for evacuation from the engine 10, illustratively via external exhaust 32. As the core gas flow 28a passes through the exhaust duct 30, an eductor effect may occur, whereby a cooling airflow 36a is drawn from a cooling airflow source (not shown), through the inlet duct 36 and through the air-cooled heat exchanger 34 before entering the exhaust duct 30 via the outlet duct 38. The cooling airflow source may be, for instance, the bypass gas flow 26a in the bypass passage 26, or ambient air source surrounding the engine 10. In some cases, in addition to or instead of flowing via an eductor effect, the cooling airflow 36a may be forcibly driven through the air-cooled heat exchanger 34 towards the exhaust duct 30, with the closure 42 in its open configuration.

FIG. 2B illustratively depicts the engine 10 in a non-operational or non-running state or condition, for instance after an engine shutdown procedure or condition. Stated differently, the core gas flow 28a is no longer actively flowing through the main gas path 28. Remaining or lingering core gas flow 28a, and exhaust flow 30a, may remain to be evacuated. As the core gas flow 28a and exhaust flow 30a are no longer actively flowing, there may no longer be a strong enough flow to create an eductor effect for drawing the cooling airflow 36a through the air-cooled heat exchanger 34. In addition, in the depicted embodiment, the outlet duct 38 is disposed above, i.e., in an upward direction from, the exhaust duct 30 relative to the longitudinal axis 11. As such, the hot exhaust flow 30a may attempt to evacuate from the exhaust duct 30 upwardly via the outlet duct 38 instead of or in addition to via the external exhaust 32. In other cases, the outlet duct 38 may be disposed adjacent or alongside the exhaust duct 30 relative to the longitudinal axis 11. In such a configuration, the adjacent outlet duct 38 may still provide a possible passageway for the hot exhaust flow 30a to evacuate from the exhaust duct 30. In some embodiments, the air-cooled heat exchanger 34 may be a temperature-sensitive component, i.e., it includes one or more materials (e.g., aluminum) that are susceptible to damage (e.g., burning or melting) when exposed to excess heat. By closing the closure 42 and preventing hot exhaust flow 30a from traveling upstream in the heat exchanger duct, heat-related damage to the air-cooled heat exchanger 34 due to exposure to the hot exhaust flow 30a may thus be prevented.

In an exemplary embodiment, the core gas flow 28a exiting the main gas path 28 and the exhaust flow may be at temperatures of around 1000 degrees fahrenheit. If such gases were to flow upstream into the outlet duct 38, they may melt, burn or otherwise damage one or more components of the air-cooled heat exchanger 34. In addition, the various tubes and fittings joining the air-cooled heat exchanger 34 to the heat exchanger duct may be susceptible to high temperature-related damage. The closure arrangement may thus prevent such damage.

Referring to FIG. 3, the closure 42 is shown in the open position (see FIG. 2A). The biasing member 52 is therefore biased or tilted forward and upward relative to the axis 11 by the incoming main gas path flow 28 and/or exhaust flow 30a during the operating condition of the engine 10, which motion actuates the linking mechanism 50 to bias the closure 42 into the open position. In the shown case, the linking mechanism 50 is formed by a pin slot arrangement (also referred to as a pin-sot linkage mechanism), whereby a first rotating arm 50a is operatively coupled to the biasing member 52 (and fixed to a duct wall 38a), a second rotating arm 50b is operatively coupled to one of the plates 44, with the first and second rotating arms 50a, 50b operatively coupled to one another at a pin slot 50c. Various shapes and sizes for the biasing member 52 may be contemplated, for instance for improved aerodynamics and force/or generation.

In operation, as the biasing member 52 is biased forward by the force generated by the incoming main gas path flow 28 and/or exhaust flow 30a, this motion is transferred via the rotating arms 50a, 50b (also referred to as levers) and pin slot 50c to one of the plates, which biases the other plates 44 (by way of the rod 48) into the closure's 42 open position (see FIG. 2A). In this open position, the plates 44 are pivoted to align with a direction of the flow of the cooling airflow 36a in the heat exchanger duct. As such, spaces or apertures are formed between adjacent plates 44, allowing the cooling airflow 36c to pass therethrough. As such, in the operating condition of the engine 10, the cooling airflow 36a may flow through the outlet duct 38, through the open closure 42, into the exhaust duct 30.

As the engine 10 transitions to a shutdown condition, whereby the flow of the main gas path flow 28a slows to a stop, the force generated by the pressure of the incoming main gas path flow 28a and/or exhaust flow 30a decreases, and the basing force acting on the biasing member 52 causes the biasing member 52 to displace rearward and downward (see FIG. 2B). In some cases, the biasing member 52 may be provided with a spring and/or weight to further contribute to the biasing force (i.e., assist its rearward and downward movement) at engine shutdown. This motion is transferred via the rotating arms 50a, 50b and pin slot 50c to one of the plates 44, which biases the other plates 44 (by way of the rod 48) into the closure's 42 closed position (see FIG. 2B). In other cases, the linkage mechanism 50 may be operatively coupled directly to the rod 48 rather than to one of the plates 44. In this position, the plates 44 may pivot to extend transversally relative to the direction of the flow of the cooling air 36a blocking the previously-formed apertures between adjacent plates 44. In some cases, the distal ends of the plates 44 may overlap one another in the closed position. In some cases, rubber or other sealing materials may be disposed at distal ends of the plates 44 so that they may create an air-tight seal when in their closed position. As such, in the shutdown condition of the engine 10, hot exhaust flow 30a is prevented from travelling upstream in the outlet duct 38 towards the air-cooled heat exchanger 34 due to the closed closure 42. Other linkage mechanisms 50 may be contemplated, for instance a rack and pinion arrangement or a cable and yoke arrangement. In addition, while the components of the linkage mechanism 50 (i.e., the rotating arms 50a, 50b) are illustratively shown as being disposed internally in the outlet duct 38, one or more components of the linkage mechanism 50 may be disposed externally to the outlet duct 38. Advantageously, the arrangement of cover 40, linking mechanism 50 and biasing member 52 may allow cooling airflow 36a to flow from the air-cooled heat exchanger 34 to the exhaust duct 30 during the operating condition of the engine 10, but prevent hot gasses (i.e., exhaust flow 30a) from flowing upstream into the outlet duct 38 and through the air-cooled heat exchanger 34 (also referred to as a soak-back condition), which may be susceptible to temperature-related damage such as melting or burning.

Figure 4A:
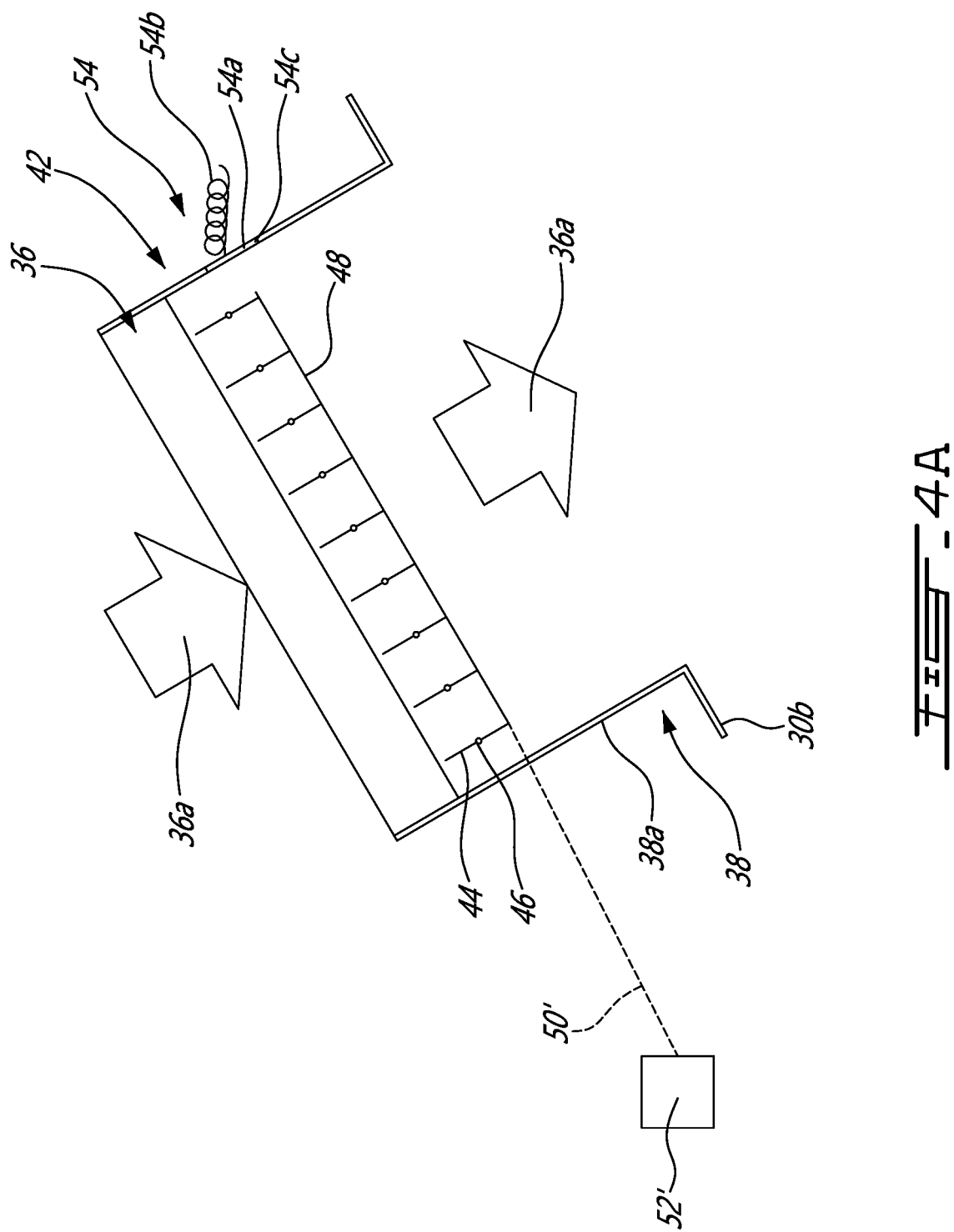
FIG. 4A is a schematic cross sectional view of a heat exchanger duct for another embodiment of an exhaust section of the engine of FIG. 1 in the first engine operational mode.

Referring to FIGS. 4A-4B, another heat exchanger duct according to the present disclosure is shown, with like reference numerals referring to like elements. It is understood that various features shown in the heat exchanger duct of FIGS. 2A-3 may be implemented in the heat exchanger duct of FIGS. 4A-4B, and vice-versa. In the shown case, an evacuation valve 54 is provided in the outlet duct 38, downstream of the closure 42, for selectively evacuating hot exhaust gas 30a to an evacuation location, as will be discussed in further detail below. As was the case with the embodiment shown in FIGS. 2A-3, the closure 42 shown in FIGS. 4A-4B is arranged so that, in an operating condition of the engine 10 (shown in FIG. 4A), cooling air 36a is allowed to flow from the air-cooled exchanger 34, through the outlet duct 38, and into the exhaust duct 30 (having duct wall 30b) due to closure 42 being in an open position (while maintaining the valve 54 in a closed position), and so that in a shutdown condition of the engine 10 (shown in FIG. 4B), the hot exhaust flow 30a is prevented from flowing upstream in the air outlet 38 towards the air-cooled heat exchanger 34 (due to closure 42 being in a closed position), and instead is evacuated via the valve 54 (now in an open position) to an evacuation location and/or continues to flow through the exhaust duct 30 towards the external exhaust 32 (not shown in FIGS. 4A-4B).

As will be discussed in further detail below, the valve 54 is movable between the open and closed positions or configurations based on an alteration of an operational condition or state of the engine 10. Stated differently, the valve 54 may assume its closed position in an engine operational condition (i.e., when then engine 10 is running), and may assume its open position in an engine shutdown state. As will be discussed in further detail below, the position of the valve 54 (and thus the operating condition of the engine 10) may correspond to the presence or absence of the cooling airflow 36a flowing through the air-cooled heat exchanger 34 towards the exhaust duct 30. The presence or absence of the flowing cooling airflow 36a, and thus the air pressure of the cooling airflow 36a, may cause the valve 54 to open or close. Other engine airflows may directly or indirectly affect the open or closed positions of the valve 54, as will be discussed in further detail below.

In the shown embodiment, but not necessarily the case in all embodiments, the evacuation valve 54 is a spring-activated door comprising a door 54a, a spring 54b, and a hinge 54c. In the shown case, the hinge 54c is disposed at the downstream end of the door 54a relative to the flow of cooling air 36a in the heat exchanger duct, although the opposite arrangement (i.e., the hinge 54c disposed at the upstream end of the door 54a) may be contemplated. A force generated on the door 54a by the spring 54b may bias the door 54a open, as shown in FIG. 4B in the shutdown condition of the engine 10, thereby allowing the hot exhaust flow 30a to evacuate the outlet duct 38 towards the evacuation location. In the operating condition of the engine 10, the flow of the cooling airflow 36a may generate a force against the door 54a that is opposite to and greater than the force of the spring 54b, thereby closing the door 54a. The valve 54 may thus be referred to as a passive valve, as it is biased between its open and closed positions based on the presence or absence of certain airflows in the outlet duct 38.

In other cases, the spring 54b may be omitted, and the hinged door 54a may bias open or closed solely based on the flow of the cooling airflow 36a (biasing the door 54a to the closed position due to negative pressure) or the flow of the hot exhaust flow 30a (biasing the door 54a to the open position due to positive pressure). Other valve types may be contemplated, for instance a thermally activated valve operable to bias towards the valve towards the closed position below a predetermined temperature associated with the operating condition of the engine 10 (e.g., indicative of the presence of the cooling airflow 36a in the outlet duct 38) and towards the open position above the predetermined temperature (e.g., indicative of the presence of hot exhaust flow in the outlet duct 38). Yet other valve types may be contemplated, such as mechanically-activated (e.g., solenoid) valves.

As was the case in the embodiment shown in FIGS. 2A-3, a cover 40 is disposed in the outlet duct 38 downstream of the air-cooled heat exchanger 34. The cover 40 illustratively includes a closure 42 having plates 44 mounted to a duct wall 38a via pins 46 and operatively coupled to one another via rod 48. The closure is selectively displaceable between an open position (FIG. 4A) to fluidly connect the heat exchanger duct to the exhaust duct 30, and a closed position (FIG. 4B) to fluidly disconnect the heat exchanger from the exhaust duct 30. A linkage mechanism 50' operatively couples the cover 40 to a biasing member 52'. In some cases, biasing member 52' may be disposed in the exhaust duct 30 and may be biased by a force generated by the flow of the core gas flow 28a, as was the case in the embodiment shown in FIGS. 2A-3. In other cases, the biasing member 52' may be disposed in another location in the engine 10 and may be exposed to another pressurized fluid flow for actuation thereof, the flow of said fluid indicative of the engine 10 being in the operating condition or the shutdown condition. In operation, as the biasing member 52' is biased to a first position indicative of the engine 10 being in an operating condition, this position is transferred via the linking mechanism 50' to the rod 48, which biases the plates 44 into the closure's 42 open position (see FIG. 4A). As such, in the operating condition of the engine 10, the cooling airflow 36a may flow through the outlet duct 38, through the open closure 42, into the exhaust duct 30. As the engine 10 transitions to a shutdown condition, the biasing member 52' is biased to a second position indicative of the engine 10 being in the shutdown condition, and this position is transferred via the linking mechanism 50', which biases the plates 44 into the closure's 42 closed position (see FIG. 4B). As such, in the shutdown condition of the engine 10, hot exhaust flow 30a is prevented from travelling upstream in the outlet duct 38 towards the air-cooled heat exchanger 34 due to the closed closure 42. Advantageously, the arrangement of the cover 40, the linking mechanism 50' and the biasing member 52', as well as the selective opening of the valve 54 may prevent hot gasses (i.e., exhaust flow 30a) from flowing upstream into the outlet duct 38 and through the air-cooled heat exchanger 34 (also referred to as a soak-back condition), which may be susceptible to temperature-related damage such as melting or burning. In other cases, the linking mechanism 50' and biasing member 52' may be replaced with another actuating mechanism for biasing the plates 44, for instance a mechanically or electronically actuating module.

Figure 5A:
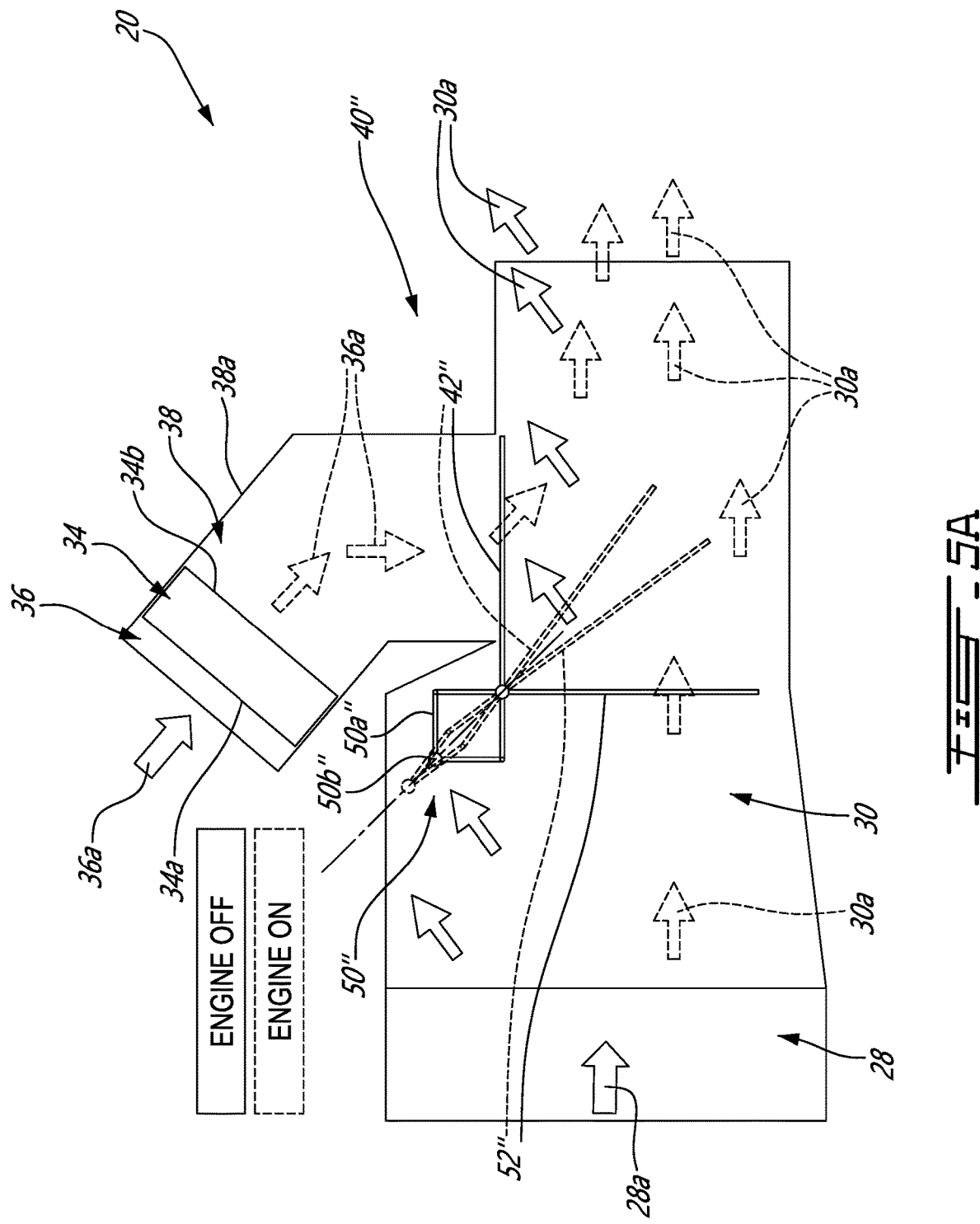

Referring to FIGS. 5A-5B, another heat exchanger duct according to the present disclosure is shown, with like reference numerals referring to like elements. It is understood that various features shown in the heat exchanger ducts of FIGS. 2A-4B may be implemented in the heat exchanger duct of FIGS. 5A-5B, and vice-versa. As was the case with the heat exchanger duct shown in FIGS. 2A-2B, a cover 40" comprising a closure 42" is disposed in the outlet duct 38, illustratively at the downstream end of the outlet duct 38 relative to a flow direction of the cooling airflow 36a. A biasing member 52" is disposed in the exhaust duct 30 and exposed to the flow of the main gas path 28. The closure 42" is shown to be a single plate or paddle sized and dimensioned to correspond with a cross-sectional area of the outlet duct 38. The biasing member 52" is operatively coupled to the closure 42" via linking mechanism 50" and is operable to bias the closure 42" between an open position (represented in FIGS. 5A and 5B as broken lines) during an operational condition of the engine 10 and a closed position (represented in FIGS. 5A and 5B as solid lines) during a shutdown condition of the engine 10.

The shown linking mechanism 50" illustratively includes a plurality of link members 50a" coupled together via pivots 50b" and operatively coupling the closure 42" to the biasing member 52" in a scissor linking mechanism. Stated differently, as the biasing member 52" is biased forward and upward relative to the axis 11 by a force generated by the flow of the core gas path 28a and/or the exhaust flow 30a (i.e., during an operating condition of the engine 10), the linking mechanism 50" biases the closure 42" in a corresponding rearward and downward direction (i.e., the open position of the closure 42"), thereby allowing fluid communication between the outlet duct 38 and the exhaust duct 30. Stated differently, movement of the biasing member 52" is equal and opposite to movement of the closure 42" by way of the linking mechanism 50". In other cases, said movements may be opposite but proportional. Similarly, as the flow of the core gas path 28a and/or the exhaust flow 30a slows and eventually stops (i.e., at a shutdown condition of the engine 10), the force acting against the biasing member 52" decreases and the biasing member 52" is biased rearward and downward (for instance, due to the force of gravity). In some cases, the biasing member 52" may be provided with a spring and/or weight to further assist its rearward and downward movement at engine shutdown. This movement is transferred to the closure 42" via the linking mechanism 50", which displaces in a corresponding upward and forward manner (i.e., the closed position of the closure 42") to block or cover the outlet duct 38, thereby blocking fluid communication between the outlet duct 38 and the exhaust duct 30. The scissor-like displacement of the link members 50a" mirrors that of the closure 42" and the biasing member 52", in that their movement is intimately linked and they displace in concert either towards or away from each other. Advantageously, the arrangement of cover 40", linking mechanism 50" and biasing member 52" may allow cooling airflow 36a to flow from the air-cooled heat exchanger 34 to the exhaust duct 30 during the operating condition of the engine 10, but prevent hot gasses (i.e., exhaust flow 30a) from flowing upstream into the outlet duct 38 and through the air-cooled heat exchanger 34 (also referred to as a soak-back condition), which may be susceptible to temperature-related damage such as melting or burning.

In various embodiments, the cover 40, 40" may be said to be substantially closed (and the outlet duct 38 substantially sealed), as only a negligible volume of hot exhaust flow 30a is permitted to flow upstream into the outlet duct 38. In other cases, the closure 42, 42" may be closed in a manner to better seal the outlet duct 38 in the closed position of the cover 40 (for instance, with rubber pieces disposed at distal ends of the plates 44 to abut and compress against adjacent plates 44) such that the cover 40, 40" may be said to be sealed in an airtight manner.

In accordance with the present disclosure, an exemplary method is shown for operating an aircraft engine 10. The aircraft engine 10 is operated in a powered mode that includes passing a gas through a heat exchanger 34 towards an exhaust duct 30 of the aircraft engine 10. The aircraft engine is transitioned from the powered mode into shut down, the transitioning including preventing exhaust gas 30a from flowing from the exhaust duct 30 towards the heat exchanger 34, said preventing including actuating a biasing member 52 disposed in the exhaust duct 30 to bias a closure 42 disposed fluidly between the heat exchanger 34 and the exhaust duct 30 closed.

It can be appreciated from the foregoing that at least some embodiments have a passive, airflow-based system for preventing hot exhaust gasses from traveling upstream a heat exchanger duct, thereby allowing temperature-sensitive components of the heat exchanger to be protected at engine shutdown.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
   an exhaust duct receiving a gas flow from the aircraft engine, the gas flow being at a first pressure during an operating condition of the aircraft engine and at a second pressure during a shutdown condition of the aircraft engine, the second pressure being lower than the first pressure;
   a heat exchanger duct having an air inlet for receiving a flow of cooling air and an air outlet fluidly connected to the exhaust duct;
   an air-cooled heat exchanger disposed in the heat exchanger duct between the air inlet and the air outlet;
   a cover disposed in the heat exchanger duct downstream of the air-cooled heat exchanger, the cover including a closure movable between an open position to fluidly connect the heat exchanger duct to the exhaust duct, and a closed position to fluidly disconnect the heat exchanger duct from the exhaust duct; and
   a biasing member disposed in the exhaust duct, the biasing member exposed to the gas flow and operatively connected to the closure, the biasing member biasing the closure toward the closed position with a biasing force, a first force generated on the biasing member by the gas flow at the first pressure being greater than a second force generated on the biasing member by the gas flow at the second pressure, the first and second forces opposing the biasing force, the biasing force being greater than the second force and less than the first force.

2. The aircraft engine as defined in claim 1, wherein the closure includes a plurality of plates pivotally mounted to a duct wall of the heat exchanger duct and pivotable between the open position, in which the plates are aligned with a direction of the flow of cooling air in the heat exchanger duct, and the closed position, in which the plates extend transversally relative to the direction of the flow of the cooling air.

3. The aircraft engine as defined in claim 2, wherein the biasing member is operatively coupled to the closure via a pin-slot linkage mechanism.

4. The aircraft engine as defined in claim 2, further comprising a rod operatively coupled to the biasing member and to distal ends of the plurality of plates, the plurality of plates pivotable in unison upon displacement of the rod.

5. The aircraft engine as defined in claim 1, wherein the closure includes a single plate, the single plate shaped and dimensioned to correspond with a cross-sectional area of the heat exchanger duct.

6. The aircraft engine as defined in claim 5, wherein the biasing member is operatively coupled to the single plate via a scissor linking mechanism.

7. The aircraft engine as defined in claim 6, wherein movement of the biasing member is equal and opposite to movement of the single plate by way of the scissor linking mechanism.

8. The aircraft engine as defined in claim 1, further comprising a valve in a duct wall of the heat exchanger duct downstream of the closure, the valve selectively fluidly connecting the heat exchanger duct to an evacuation location, the valve being movable between a closed position during the operating condition of the aircraft engine to fluidly disconnect the heat exchanger duct to the evacuation location, and an open position during the shutdown condition of the aircraft engine to fluidly connect the heat exchanger duct to the evacuation location.

9. The aircraft engine as defined in claim 8, wherein the valve includes a spring operatively connected to a hinged door, the spring having a spring force biasing the hinged door into the open position, and wherein the flow of cooling air is at a first pressure during the operating condition of the aircraft engine and a second pressure during the shutdown condition of the aircraft engine, a first force generated on the hinged door by the flow of cooling air at the first pressure being greater than a second force generated on the hinged door by the flow of cooling air at the second pressure, the first and second forces opposing the spring force, the spring force being greater than the second force and less than the first force.

10. A cover system for selectively allowing a flow of cooling air through a heat exchanger duct upstream of an exhaust duct in an aircraft engine, the heat exchanger duct including an air-cooled heat exchanger disposed therein, comprising:
    a source of pressurized fluid fluidly connected to the exhaust duct, the pressurized fluid flowing into the exhaust duct at a first pressure during an operating condition of the aircraft engine and at a second pressure during a shutdown condition of the aircraft engine, the second pressure being lower than the first pressure;
    a closure movable between an open position in which the closure fluidly connects the heat exchanger duct to the exhaust duct, and a closed position in which the closure fluidly disconnects the heat exchanger duct to the exhaust duct; and
    a biasing member disposed in the exhaust duct and operatively connected to the closure, the biasing member biasing the closure towards the closed position with a biasing force;
    wherein, during the operating condition of the aircraft engine, the first pressure of the pressurized fluid creates a first force acting against the biasing force of the biasing member, the first force being greater than the biasing force to urge the closure into the open position; and
    during the shutdown condition of the aircraft engine, the second pressure of the pressurized fluid creates a second force acting against the biasing force, the biasing force being greater than the second force to bias the closure into the closed position.

11. The cover system as defined in claim 10, wherein the closure includes a plurality of plates pivotally mounted to a duct wall of the heat exchanger duct and pivotable between the open position, in which the plates are aligned with a direction of the flow of cooling air in the heat exchanger duct, and the closed position, in which the plates extend transversally relative to the direction of the flow of the cooling air.

12. The cover system as defined in claim 11, wherein the biasing member is operatively coupled to the closure via a pin-slot linkage mechanism.

13. The cover system as defined in claim 11, further comprising a rod operatively coupled to the biasing member and to distal ends of the plurality of plates, the plurality of plates pivotable in unison upon displacement of the rod.

14. The cover system as defined in claim 10, wherein the closure includes a single plate, the single plate shaped and dimensioned to correspond with a cross-sectional area of the heat exchanger duct.

15. The cover system as defined in claim 14, wherein the biasing member is operatively coupled to the single plate via a scissor linking mechanism.

16. The cover system as defined in claim 15, wherein movement of the biasing member is equal and opposite to movement of the single plate by way of the scissor linking mechanism.

17. The cover system as defined in claim 10, further comprising a valve in a duct wall of the heat exchanger duct downstream of the closure, the valve selectively fluidly connecting the heat exchanger duct to an evacuation location, the valve being movable between a closed position during the operating condition of the aircraft engine to fluidly disconnect the heat exchanger duct to the evacuation location, and an open position during the shutdown condition of the aircraft engine to fluidly connect the heat exchanger duct to the evacuation location.

18. The cover system as defined in claim 17, wherein the valve includes a spring operatively connected to a hinged door, the spring having a spring force biasing the hinged door into the open position, and wherein the flow of cooling air is at a first pressure during the operating condition of the aircraft engine and a second pressure during the shutdown condition of the aircraft engine, a first force generated on the hinged door by the flow of cooling air at the first pressure being greater than a second force generated on the hinged door by the flow of cooling air at the second pressure, the first and second forces opposing the spring force, the spring force being greater than the second force and less than the first force.

19. A method of operating an aircraft engine, comprising:
    the aircraft engine comprising:
        an exhaust duct receiving a gas flow from the aircraft engine, the gas flow being at a first pressure during an operating condition of the aircraft engine and at a second pressure during a shutdown condition of the aircraft engine, the second pressure being lower than the first pressure;
        a heat exchanger duct having an air inlet for receiving a flow of cooling air and an air outlet fluidly connected to the exhaust duct;
        an air-cooled heat exchanger disposed in the heat exchanger duct between the air inlet and the air outlet;
        a cover disposed in the heat exchanger duct downstream of the air-cooled heat exchanger, the cover including a closure movable between an open position to fluidly connect the heat exchanger duct to the exhaust duct, and a closed position to fluidly disconnect the heat exchanger duct from the exhaust duct; and
        a biasing member disposed in the exhaust duct, the biasing member exposed to the gas flow and operatively connected to the closure, the biasing member biasing the closure toward the closed position with a biasing force, a first force generated on the biasing member by the gas flow at the first pressure being greater than a second force generated on the biasing member by the gas flow at the second pressure, the first and second forces opposing the biasing force, the biasing force being greater than the second force and less than the first force;
    the method comprising:
        operating the aircraft engine in the operating condition that includes passing the flow of cooling air through the air-cooled heat exchanger towards the exhaust duct of the aircraft engine; and
        transitioning the aircraft engine from the operating condition into the shutdown condition, the transitioning including preventing exhaust gas from flowing from the exhaust duct towards the air-cooled heat exchanger, said preventing including the biasing member biasing the closure disposed fluidly between the air-cooled heat exchanger and the exhaust duct to the closed position.

20. The method as defined in claim 19, wherein transitioning the aircraft engine from the operating condition into the shutdown condition further comprises evacuating the exhaust gas via an evacuation valve disposed fluidly between the air-cooled heat exchanger and the exhaust duct.

* * * * *